(12) United States Patent
Shimizu et al.

(10) Patent No.: US 9,582,229 B2
(45) Date of Patent: Feb. 28, 2017

(54) IMAGE FORMING APPARATUS CONFIGURED FOR EFFICIENT SHIPPING THEREOF, METHOD FOR SAME, AND METHOD AND KITTING SYSTEM FOR EFFICIENT INSTALLATION THEREOF

(71) Applicant: CASIO COMPUTER CO., LTD., Tokyo (JP)

(72) Inventors: Akihiro Shimizu, Hachioji (JP); Yasuo Kishigami, Kodaira (JP)

(73) Assignee: CASIO COMPUTER CO., LTD. (JP)

( * ) Notice: Subject to any disclaimer, the term of this patent is extended or adjusted under 35 U.S.C. 154(b) by 0 days.

(21) Appl. No.: 15/000,580

(22) Filed: Jan. 19, 2016

(65) Prior Publication Data

US 2016/0210090 A1 Jul. 21, 2016

(30) Foreign Application Priority Data

Jan. 20, 2015 (JP) ................ 2015-008477

(51) Int. Cl.
*G06F 15/00* (2006.01)
*G06F 3/12* (2006.01)
*G06K 1/00* (2006.01)
*G06Q 10/08* (2012.01)

(52) U.S. Cl.
CPC ............ *G06F 3/1231* (2013.01); *G06F 3/123* (2013.01); *G06F 3/1205* (2013.01); *G06Q 10/0838* (2013.01)

(58) Field of Classification Search
CPC ...... G06F 3/1231; G06F 3/1205; G06F 3/123; G06Q 10/0838
USPC .................................................. 358/1.1–1.15
See application file for complete search history.

(56) References Cited

U.S. PATENT DOCUMENTS

| 2013/0057896 A1* | 3/2013 | Ito ...................... H04N 1/00204 358/1.14 |
| 2014/0258380 A1* | 9/2014 | Urakawa ................. H04L 67/42 709/203 |

FOREIGN PATENT DOCUMENTS

| JP | 2006-289690 A | 10/2006 |
| JP | 2009-100103 A | 5/2009 |

* cited by examiner

*Primary Examiner* — Douglas Tran
(74) *Attorney, Agent, or Firm* — Fitch Even Tabin & Flannery LLP

(57) ABSTRACT

Control processing reads out a serial number of an image forming apparatus from a serial number storage area, and reads out order information corresponding to the serial number from a shipping table written in a shipping table storage area before shipping. In addition, the control processing reads out, from an order table in a USB memory, preset setting information associated with the order information, and writes the read information in a non-volatile storage area. Then, by the system being restarted, a network, printing conditions, and the like are set according to the preset setting information written in the non-volatile storage area.

15 Claims, 11 Drawing Sheets

FIG. 4

WHEN SERIAL NUMBER SN IS "7120000288"

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 7 | 1 | 2 | 0 | 0 | 0 | 0 | 2 | 8 | 8 | ¥0 | ¥0 | ¥0 | ¥0 | ¥0 | ¥0 |

207 (pointing to column 11)

| # | IP ADDRESS | DEFAULT GATEWAY | SUBNET MASK | COLOR PRINTING | TWO-SIDED PRINTING | MULTI-PAGE | TONER SAVING | STAMP PRINTING | COPY GUARD | VERIFICATION PRINTING | MANAGEMENT BARCODE | OTHERS |
|---|---|---|---|---|---|---|---|---|---|---|---|---|
| 1 | ***.+++.011.005 | ***.+++.011.200 | 255.255.255.0 | 1 | O | O | O | O | O |  | O | O |
| 2 | ***.+++.011.006 | ***.+++.011.200 | 255.255.255.0 | 1 | 1 | 1 | O | 1 | 1 | 1 | O | O |
| 3 | ***.+++.011.007 | ***.+++.011.200 | 255.255.255.0 | O | 1 | 1 | 1 | 1 | 1 | 1 | 1 | O |
| 4 | ***.+++.012.012 | ***.+++.012.200 | 255.255.255.0 | 1 | 1 | 1 | O | O | 1 | 1 | 1 | O |
| 5 | ***.+++.012.013 | ***.+++.012.200 | 255.255.255.0 | O | 1 | 1 | 1 | 1 | 1 | 1 | 1 | O |
| 6 | ***.+++.012.014 | ***.+++.012.200 | 255.255.255.0 | O | 1 | 1 | 1 | 1 | 1 | O | 1 | O |
| 7 | ***.+++.012.015 | ***.+++.012.200 | 255.255.255.0 | O | 1 | 1 | 1 | 1 | 1 | 1 | 1 | O |
| * | AUTOMATICALLY OBTAIN DHCP | | | O | 1 | 1 | 1 | 1 | 1 | O | 1 | O |
| 8 | | | | | | | | | | | | |
| 9 | | | | | | | | | | | | |
| 10 | | | | | | | | | | | | |

| SHIPPING DATE | SHIPPING DESTINATION NAME | BRANCH NAME | BRANCH ADDRESS | SERIAL NUMBER |
|---|---|---|---|---|
| FIFTH DAY OF X-TH MONTH | SUPERMARKET XX | KAWAGOE STORE | X-Y-Z, X-CHO, KAWAGOE-SHI | 7120000281 |
| FIFTH DAY OF X-TH MONTH | SUPERMARKET XX | KAWAGOE STORE | X-Y-Z, X-CHO, KAWAGOE-SHI | 7120000282 |

602

| SHIPPING DATE | SHIPPING DESTINATION NAME | STORE NAME | STORE ADDRESS | SERIAL NUMBER |
|---|---|---|---|---|
| SIXTH DAY OF X-TH MONTH | SUPERMARKET XX | GYODA STORE | X-Y-Z, X-CHO, GYODA-SHI | 7120000283 |
| SIXTH DAY OF X-TH MONTH | SUPERMARKET XX | CHICHIBU STORE | X-Y-Z, XX-CHO, CHICHIBU-SHI | 7120000284 |
| SIXTH DAY OF X-TH MONTH | SUPERMARKET XX | TOKOROZAWA STORE | X-Y-Z, TOKOROZAWA-SHI | 7120000285 |

603

| SHIPPING DATE | SHIPPING DESTINATION NAME | STORE NAME | STORE ADDRESS | SERIAL NUMBER |
|---|---|---|---|---|
| SEVENTH DAY OF X-TH MONTH | SUPERMARKET XX | KUMAGAYA STORE | X-Y-Z, X-CHO, KUMAGAYA-SHI | 7120000286 |
| SEVENTH DAY OF X-TH MONTH | SUPERMARKET XX | KAWAGUCHI STORE | X-Y-Z, KAWAGUCHI-SHI | 7120000287 |

604

| SHIPPING DATE | SHIPPING DESTINATION NAME | STORE NAME | STORE ADDRESS | SERIAL NUMBER |
|---|---|---|---|---|
| EIGHTH DAY OF X-TH MONTH | SUPERMARKET XX | SAITAMA MAIN STORE | X-Y-Z, X-KU, SAITAMA-SHI | 7120000288 |
| EIGHTH DAY OF X-TH MONTH | SUPERMARKET XX | SAITAMA MAIN STORE | X-Y-Z, X-KU, SAITAMA-SHI | 7120000289 |
| EIGHTH DAY OF X-TH MONTH | SUPERMARKET XX | SAITAMA MAIN STORE | X-Y-Z, X-KU, SAITAMA-SHI | 7120000290 |

FIG. 11

IN IMAGE FORMING APPARATUS 400 FOR SHIPMENT
ON EIGHTH DAY OF X-TH MONTH

603

| | | | | SN |
|---|---|---|---|---|
| EIGHTH DAY OF X-TH MONTH | SUPERMARKET XX | SAITAMA MAIN STORE A | X-Y-Z, X-KU, SAITAMA-SHI | 7120000288 ← CHECK → 7120000288 |
| EIGHTH DAY OF X-TH MONTH | SUPERMARKET XX | SAITAMA MAIN STORE B | X-Y-Z, X-KU, SAITAMA-SHI | 7120000289 |
| EIGHTH DAY OF X-TH MONTH | SUPERMARKET XX | SAITAMA MAIN STORE C | X-Y-Z, X-KU, SAITAMA-SHI | 7120000290 |

ORDER SHEET 500

MATCH

IN USB MEMORY 111

| | BRANCH NAME | BRANCH ADDRESS | IP ADDRESS | DEFAULT GATEWAY | COLOR PRINT-ING | TWO-SIDED PRINT-ING | MULTI-PAGE | TONER SAV-ING |
|---|---|---|---|---|---|---|---|---|
| 1 | SAITAMA MAIN STORE A | X-Y-Z, X-KU, SAITAMA-SHI | ***.+++.011.005 | ***.+++.011.200 | 1 | 0 | 0 | 0 |
| 2 | SAITAMA MAIN STORE B | X-Y-Z, X-KU, SAITAMA-SHI | ***.+++.011.006 | ***.+++.011.200 | 1 | 1 | 1 | 0 |
| 3 | SAITAMA MAIN STORE C | X-Y-Z, X-KU, SAITAMA-SHI | ***.+++.011.007 | ***.+++.011.200 | 0 | 1 | 1 | 1 |
| 4 | KAWAGOE STORE | X-Y-Z, X-CHO, KAWAGOE-SHI | ***.+++.012.012 | ***.+++.012.200 | 1 | 1 | 1 | 0 |
| * | COMMON SETTINGS | (NO SETTING INFORMATION) | AUTOMATICAL-LY ACQUIRE DHCP | ***.+++.012.200 | 0 | 1 | 1 | 1 |

PS

IMAGE FORMING APPARATUS CONFIGURED FOR EFFICIENT SHIPPING THEREOF, METHOD FOR SAME, AND METHOD AND KITTING SYSTEM FOR EFFICIENT INSTALLATION THEREOF

CROSS-REFERENCE TO RELATED APPLICATION

This application is based upon and claims the benefit of priority from the prior Japanese Patent Application No. 2015-008477, filed Jan. 20, 2015, the entire contents of which are incorporated herein by reference.

BACKGROUND OF THE INVENTION

1. Field of the Invention

The present invention relates to an image forming apparatus, a method, and a kitting system.

2. Description of the Related Art

Conventionally, when image forming apparatuses such as printers are to be delivered to a municipal organization or the like, an IP address for each apparatus and settings regarding printing defined for each apparatus are required to be set in advance before the delivery and installation. Here, in the conventional method, an installer updates each image forming apparatus to the latest firmware, and then sets each IP address through an operation panel of the image forming apparatus. However, there is a problem in this method in that a load on the installer (serviceperson) is large, and it takes a long operation time. In addition, erroneous setting may occur when, for example, a plurality of apparatuses is installed.

Accordingly, for example, Japanese Patent Application Laid-Open (Kokai) Publication No. 2006-289690 discloses a technique in which a file having network-related information such as an IP address written therein is stored in a USB memory and, when the USB memory is inserted into a USB memory connecting section of an image forming apparatus, network setting information is read out from the file stored in the USB memory, so that network settings are automatically performed.

Also, Japanese Patent Application Laid-Open (Kokai) Publication No. 2009-100103 discloses a technique in which, when a plurality of different files (functions or programs) are found in a USB memory, they are displayed on a panel so as to be selected by the operator.

SUMMARY OF THE INVENTION

In accordance with one aspect of the present invention, there is provided a method comprising: writing identification information for identifying an image forming apparatus in each image forming apparatus; selecting image forming apparatuses having a predetermined shipping condition from image forming apparatuses in stock, based on an order table where at least order information for each image forming apparatus and preset setting information for setting for each image forming apparatus when each image forming apparatus is installed have been associated with each other; and writing, in each of the selected image forming apparatuses before shipping, a shipping table where at least the order information for each image forming apparatus and the identification information for each image forming apparatus have been associated with each other, wherein shipping tables having same contents are written in the selected image forming apparatuses.

In accordance with another aspect of the present invention, there is provided an image forming apparatus comprising: an identification information storage section which stores identification information for identifying the image forming apparatus; and a shipping table storage section which stores, before shipping, a shipping table where at least order information for each image forming apparatus and identification information for each image forming apparatus have been associated with each other, wherein shipping tables having same contents are written in image forming apparatuses having a predetermined shipping condition.

In accordance with another aspect of the present invention, there is provided a method comprising: specifying, when an image forming apparatus is turned on, order information directed to the image forming apparatus based on identification information for identifying the image forming apparatus and a shipping table written before shipping in which at least order information for each image forming apparatus and identification information for each image forming apparatus have been associated with each other, from among the order information for each image forming apparatus included in the shipping table; reading out preset setting information for the image forming apparatus from an order table where at least the order information for each image forming apparatus and preset setting information for setting in each image forming apparatus when each image forming apparatus is installed have been associated with each other, based on the specified order information directed to the image forming apparatus; and setting an operation condition of the image forming apparatus based on the preset setting information, wherein contents of the shipping table written in the image forming apparatus and contents of a shipping table of another image forming apparatus having a same predetermined shipping condition are identical.

In accordance with another aspect of the present invention, there is provided a kitting system constituted by an image forming apparatus and an external storage medium, wherein the external storage medium stores an order table where at least order information for each image forming apparatus and preset setting information for setting each image forming apparatus when each image forming apparatus is installed have been associated with each other, and wherein the image forming apparatus comprises: an identification information storage section which stores identification information for identifying the image forming apparatus, a shipping table storage section which stores, before shipping, a shipping table where at least the order information for each image forming apparatus and identification information for each image forming apparatus have been associated with each other, a specifying section which specifies order information directed to the image forming apparatus based on the identification information of the image forming apparatus stored in the identification information storage section and the shipping table stored in the shipping table storage section, and a setting section which (i) reads out preset setting information for the image forming apparatus from the order table stored in the external storage medium based on the order information directed to the image forming apparatus specified by the specifying section, and (ii) sets an operation condition of the image forming apparatus based on the preset setting information, wherein shipping tables having same contents are written in image forming apparatuses having a predetermined shipping condition.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 4 is a conceptual diagram showing an example of the storage of a serial number SN in a serial number storage area 207 according to the present embodiment;

FIG. 6 is a conceptual diagram showing an example of the order table 500 according to the present embodiment;

FIG. 7 is a conceptual diagram showing an example of a shipping table 600 according to the present embodiment;

FIG. 8 is a flowchart for describing operation from shipment to installation of the kitting system according to the present embodiment;

FIG. 11 is a conceptual diagram for describing operation at power-up of the image forming apparatus 400 according to the present embodiment.

DETAILED DESCRIPTION OF THE PREFERRED EMBODIMENT

An embodiment of the present invention will hereinafter be described with reference to the drawings.

A. Structure of Embodiment

Figure 1:
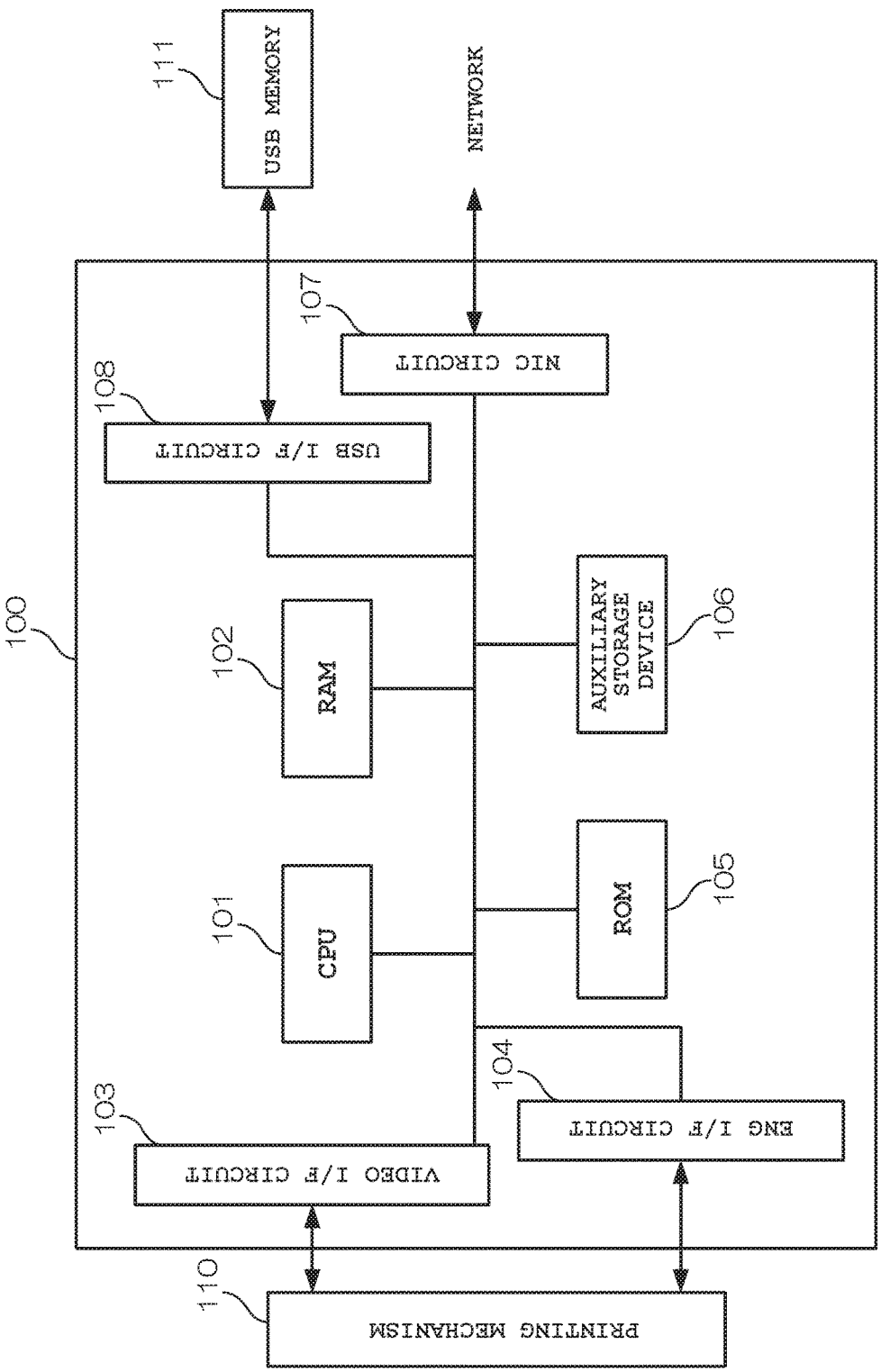
FIG. 1 is a block diagram showing the structure of a controller 100 of an image forming apparatus according to an embodiment of the present invention.

FIG. 1 is a block diagram showing the structure of a controller 100 of an image forming apparatus according to an embodiment of the present invention. In the drawing, the controller 100 includes a CPU (Central Processing Unit) 101, a RAM (Random Access Memory) 102, a Video I/F circuit 103, an ENG I/F circuit 104, a ROM (Read Only Memory) 105, an auxiliary storage device 106, a NIC (Network Information Center) circuit 107, and a USB (Universal Serial Bus) I/F circuit 108.

By executing a predetermined program, the CPU 101 controls operation of each section of the controller 100. The RAM 102 is used as a work area accompanied with the operation of the CPU 101, a work area for retaining, for example, bitmap data acquired by the conversion of print data supplied from a host device (omitted in the drawing) such as a personal computer, or the like. In particular, in the present embodiment, the RAM 102 includes a non-volatile memory which retains data even when the power supply is interrupted.

In the non-volatile memory, preset setting information PS described later, a firmware file, and the like are written. In the following, an area in the non-volatile memory where the preset setting information PS, the firmware file, and the like are to be written is referred to as a non-volatile storage area. Also, in the non-volatile memory, a 16-byte serial number for uniquely identifying the image forming apparatus is written before shipment. In the following, an area in the non-volatile memory where the serial number is to be written is referred to as a serial number storage area. Moreover, in the non-volatile memory, a shipping table 600 including the delivery destination of the image forming apparatus is written. In the following, an area in the non-volatile memory where the shipping table 600 is to be written is referred to as a shipping table storage area.

The Video I/F circuit 103 outputs image data generated from printing data stored in the auxiliary storage device 106 to a printing mechanism (such as a toner transfer device and a developing device) 110, under the control of the CPU 101. The ENG I/F circuit 104 outputs a command generated from printing data stored in the auxiliary storage device 106 to the printing mechanism 110, under the control of the CPU 101.

The ROM 105 stores a system program to be executed by the CPU 101. The auxiliary storage device 106 includes a large-capacity storage device (HDD) and the like, and functions as an image memory for accumulating printing data requested from the host device so as to be printed.

The NIC circuit 107 receives a printing request from the host device and print data via a network such as a LAN (Local Area Network), and notifies the host device of a printing status, an occurrence of error, and the like. Similarly, the USB I/F circuit 108 receives a printing request from the host device and print data, and notifies the host device of a printing status, an occurrence of error, and the like. This USB I/F circuit 108 has a USB memory 111 attached thereto. The USB memory 111 has stored thereon a firmware (a control program of the image forming apparatus 400), preset setting information including an IP address, printing conditions, and the like set for each image forming apparatus.

In a normal printing operation, print data received from the USB I/F circuit 108 or the NIC circuit 107 is subjected to command analysis/image generation by using the CPU 101, the RAM 102, and the ROM 105, and a printing operation is performed via the Video I/F circuit 103 and the ENG I/F circuit 104. Also, when the firmware is rewritten and preset setting information is set, the firmware and the preset setting information of the image forming apparatus are read out from the USB memory 111 attached to the USB I/F circuit 108, whereby an IP address and printing conditions are set. The firmware is also rewritten in a similar manner when a printing request from the host device received from the USB I/F circuit 108 or the NIC circuit 107 includes a "firmware update command".

Figure 2:
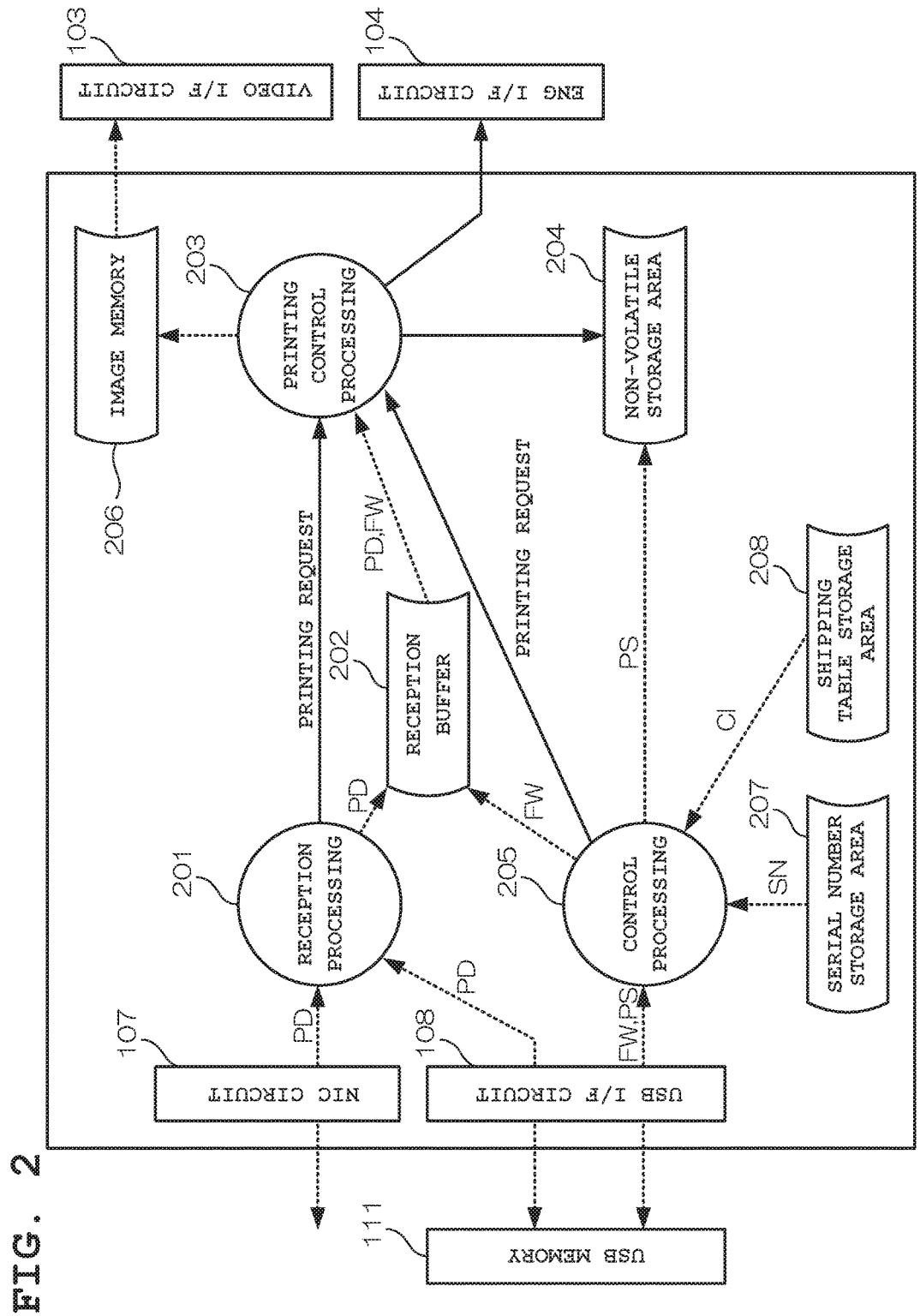
FIG. 2 is a conceptual diagram showing a processing flow of control processing in the controller 100 of the image forming apparatus according to the present embodiment.

FIG. 2 is a conceptual diagram of a processing flow of control processing in the controller 100 of the image forming apparatus according to the present embodiment. In normal printing, print data PD received by reception processing 201 via the NIC circuit 107 or the USB I/F circuit 108 is stored in a reception buffer 202, and a printing request is provided to printing control processing 203. When the printing request is received, the printing control processing 203 reads out the print data PD from the reception buffer 202, analyzes the command, generates an image in an image memory 206, and performs printing by using the Video I/F circuit 103 and the ENG I/F circuit 104.

In the present embodiment, in "preset setting processing", control processing 205 reads out a serial number SN of the image forming apparatus from a serial number storage area 207, and reads out order information CI corresponding to the serial number SN from a shipping table 600 (which will be described in detail further below) written in a shipping table storage area 208 before shipment. Subsequently, the control processing 205 reads out the preset setting information PS associated with the order information CI from an order table 500 in the USB memory 111 via the USB I/F circuit 108, and writes the preset setting information PS in a non-volatile storage area 204. Then, by restarting the system, a network, printing conditions, and the like are set according to the preset setting information PS written in the non-volatile storage area 204. Details of the order information CI and the preset setting information PS will be described later.

When a firmware file FW has been stored in the USB memory 111, the control processing 205 reads out the firmware file FW, stores the firmware file FW together with a "firmware update command" in the reception buffer 202, and issues a printing request to the printing control processing 203. When the printing request is received and a command in print data read out from the reception buffer 202 is a "firmware update command", the main body of the firmware file FW is written in the non-volatile storage area 204. Then, by the system being restarted, the new firmware file FW written in the non-volatile storage area 204 causes the program (firmware) for controlling the image forming apparatus 400 to be rewritten (updated).

Figure 3:
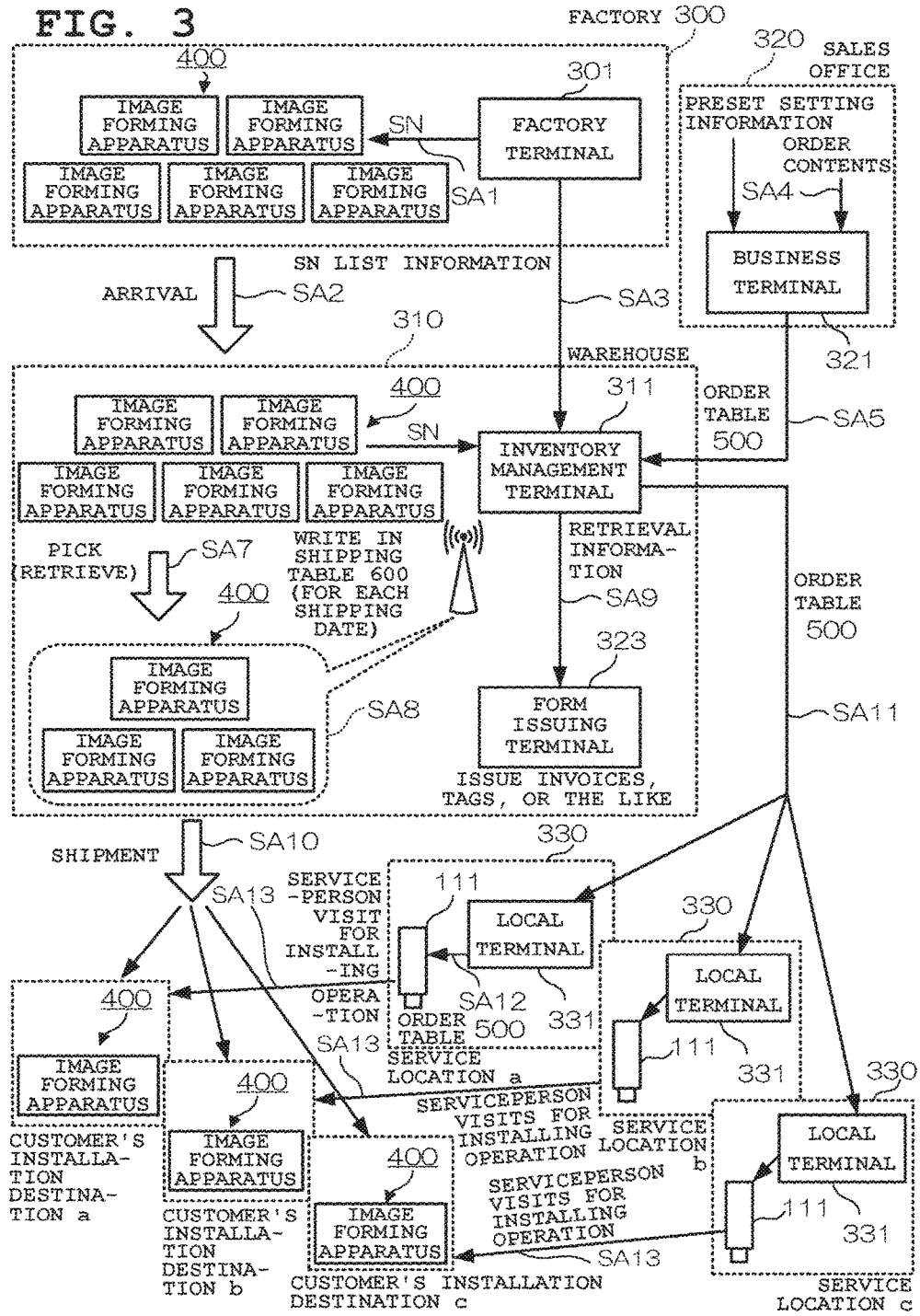
FIG. 3 is a conceptual diagram for describing a processing flow of a kitting system of the image forming apparatus according to the present embodiment.

FIG. 3 is a conceptual diagram for describing a processing flow of a kitting system in manufacturing, shipping, delivering, and installing the image forming apparatus according to the present embodiment.

<From Factory to Warehouse>

In each image forming apparatus 400 manufactured in a factory 300, the serial number SN is stored in the serial number storage area 207 of the non-volatile memory by a factory terminal 301 (Step SA1). When the image forming apparatus 400 is sent from the factory 300 and arrives at the warehouse 310 (Step SA2), the actual apparatus is warehoused, and serial number list information (SN list information) is also transmitted to an inventory management terminal 311 (Step SA3).

FIG. 4 is a conceptual diagram showing an example of the storage of the serial number SN in the serial number storage area 207 according to the present embodiment. The serial number SN is written in the serial number storage area 207 having a 16-byte area at the time of manufacturing the apparatus. Since the serial number SN is a 10-digit number in the present embodiment, "¥0" indicating no data is written in upper media ("10" to "15") of the serial number storage area 207.

Note that the serial number SN is stored in the non-volatile memory of the image forming apparatus 400, and is also clearly stated on a rated plate affixed to the exterior of the main body and on the outside of its package box (including a barcode), whereby the inventory management terminal 311 manages the image forming apparatuses 400 stocked in the warehouse 310 and the number thereof, together with their serial numbers SN.

<Meeting Between Salesperson and Customer>

A salesperson has a meeting with a buyer regarding the delivery place, the delivery date and time, the number of apparatuses to be delivered, and the setting contents thereof (such as IP address and printing conditions), and then returns to a sales office to input order details in a business terminal 321 (Step SA4). In the business terminal 321, an order table 500 (refer to FIG. 5 and FIG. 6 described later) is created, which includes the order information CI and the preset setting information PS. The order information CI includes the information of the delivery destination, the address, the name of a person receiving the delivery, the telephone number, the desired installation date, and the like, and the preset setting information PS includes the information of the network, the printing conditions, and the like.

Figure 5:
FIG. 5 is a conceptual diagram showing an example of an order table 500 according to the present embodiment.

FIG. 5 and FIG. 6 are conceptual diagrams showing an example of the order table 500 according to the present embodiment. This order table 500 includes the order information CI depicted in FIG. 5 regarding delivery destinations (branch names of supermarket XX), delivery destination addresses (branch addresses), the name of each person receiving delivery (person in charge), telephone numbers (TEL), and desired installation dates, and the preset setting information PS regarding IP addresses, default Gateways, subnet masks, (whether to perform) color printing, (whether to perform) two-sided printing, (whether to perform) multipage (printing), (whether to perform) toner saving, (whether to perform) stamp printing, (whether to provide) copy guard, (whether to perform) verification printing, (whether to provide) management barcodes, and the like.

In the setting information regarding (whether to perform) color printing, (whether to perform) two-sided printing, (whether to perform) multipage (printing), (whether to perform) toner saving, (whether to perform) stamp printing, (whether to provide) copy guard, (whether to perform) verification printing, (whether to provide) management barcodes, and the like, "1" indicates the positive, and "0" indicates the negative. For a store whose preset setting information PS does not exist, preset setting information described in common settings is used. However, this preset setting information PS is only required to be created before the shipment of the image forming apparatus 400 and, until then, the order information CI alone regarding delivery destinations (branch names of supermarket XX), delivery destination addresses (branch addresses), the name of each person receiving delivery (person in charge), telephone numbers (TEL), and desired installation dates is enough. Also, the file format of the order table 500 may be any format, such as a text format where data is separated by commas or tab codes or a unique file format that is editable by a specific application.

<Shipping Arrangement Processing>

Returning to FIG. 3, the business terminal 321 transmits the entirety of the order table 500 to the inventory management terminal 311 at the warehouse 310 (Step SA5). However, at this stage, only the order information CI may be transmitted.

<Processing Until Shipping>

The inventory management terminal 311 sets a shipping date for each order so that the ordered image forming apparatuses 400 arrive at each delivery destination of the customer at least one day before the desired installation date on the order table 500, sequentially associates (the serial numbers SN of) the image forming apparatuses 400 with the respective delivery destinations in the order in which the shipping date comes earlier (allocation processing), and creates the shipping table 600 (refer to FIG. 7 described below).

FIG. 7 is a conceptual diagram showing an example of the shipping table 600 according to the present embodiment. The shipping table 600 is created for each shipping date, and the order information CI including a shipping date, a shipping destination name, a branch name, and a branch address and a serial number(s) SN for identifying one or more image forming apparatuses 400 to be shipped on that shipping date are linked with each other. The serial number SN is allocated by allocation processing by the inventory management terminal 311.

In the example, a shipping table 601 includes a list of image forming apparatuses 400 to be shipped on a shipping date of the fifth day of the X-th month. Another shipping table 602 includes a list of image forming apparatuses 400 to be shipped on a shipping date of the sixth day of the X-th month. Still another shipping table 603 includes a list of image forming apparatuses 400 to be shipped on a shipping date of the seventh day of the X-th month. Yet another shipping table 604 includes a list of image forming apparatuses 400 to be shipped on a shipping date of the eighth day of the X-th month.

In the example depicted in FIG. 7, the shipping table 600 is created for each shipping date. However, for example, if the number of apparatuses to be shipped is large, the image forming apparatuses 400 to be shipped on the same shipping date may be divided for each shipping destination, and the shipping table 600 for each shipping destination may be written for each group of image forming apparatuses 400 acquired by the division. In addition, the file format of the shipping table 600 may be any file format, such as a text format in which data is separated by commas or tab codes or a unique file format that is editable by a specific application. Also, in the example depicted in FIG. 7, the shipping table is created such that the apparatuses are to be shipped only to the same customer. However, any combination is possible. For example, a combination of different customers, a combination of different machine types, and a combination of the image forming apparatus 400 and a product other than the image forming apparatus 400 is possible. In the following descriptions, the shipping table 600 refers to any one of the shipping tables 601 to 604 in FIG. 7 created for each shipping date.

Returning to FIG. 3, the inventory management terminal 311 uses the created shipping table 600 and creates, every day, a shipping list of image forming apparatuses 400 to be shipped on that day, picks (retrieves) a relevant image forming apparatus(es) 400 from the warehouse 310 (Step SA7), and writes the same shipping table 600 in at least one or more picked image forming apparatuses 400 (Step SA8).

The picking herein is performed by retrieving a relevant image forming apparatus 400 from the warehouse for each shipping date, each shipping destination, each shipping lane, each shipping form, each machine type, or the like. That is, the image forming apparatuses 400 with a same shipping condition are retrieved. The shipping condition herein includes one of condition items including a shipping date, a shipping destination, a shipping lane, a shipping form, a machine type, and the like. Also, the image forming apparatuses 400 with the same shipping condition refers to the image forming apparatuses 400 having the same shipping date, the same shipping destination, the same shipping lane, the same shipping form, the same machine type, or the like. The selection of a condition item as a shipping condition is made as necessary based on the efficiency of a shipping operation, the schedule, a customer's request, the contracted carrier, the cost, and the like.

In some cases, the image forming apparatuses 400 of the same shipping date have different shipping destinations, shipping lanes, shipping forms, machine types, or the like. Similarly, the image forming apparatuses 400 of the same shipping destination may have different shipping dates, shipping lanes, shipping forms, machine type, or the like. That is, although the picked image forming apparatuses 400 with the same shipping condition are shipped together, they may have different machine types, different customers (shipping destinations), and the like except a common shipping condition.

The shipping form herein includes a carrying method, a package shape, a carrier company difference, and the like, and the carrying method includes carriage by road (track/train), carriage by sea, carriage by air, and the like. Different carrying methods have different package shapes, such as loading the image forming apparatuses 400 on pallets or putting the image forming apparatuses 400 in a container, which will be described further below. The package shape herein includes packaging using normal corrugated cardboard, packaging by adding a wooden box outside corrugated cardboard, packaging for international customs clearance, and the like. The carrier company difference herein indicates that delivery time and method vary for each carrier company, or that the apparatuses are shipped by a plurality of carrier companies, such as when they are transported by road by a local carrier company, put in a container by a customs broker and shipped by sea, and then distributed at a port of call and transported by air.

Here, the shipping destination is mainly described in detail as a shipping condition item.

The shipping destination includes destination name information and address information. The destination name information includes, for example, a customer name, a direct seller name, a dealer name, and the like. When the customer name is taken as a shipping condition, the relevant image forming apparatuses 400 are shipped to all of the local branches and stores of the same customer. When the dealer name is taken as a shipping condition, the relevant image forming apparatuses 400 are shipped to the respective local warehouses of the dealer. In this embodiment, "dealer name" is written in "store name of supermarket XX" on the order table 500 and "shipping destination name" on the shipping table 600. The order table 500 is created by discussion between a salesperson and a buyer of the dealer. Regarding the direct seller name, the case of the customer name can be similarly applied, and therefore description thereof is omitted.

Another example similar to the case of the dealer name is OEM (Original Equipment Manufacturer) sales (for example, a company ships a product of another company with its brand name printed or its functions changed). In OEM sales developing worldwide, products are shipped from a warehouse to several physical distribution locations that serve as hubs for distribution to each place (country where the products are to be sold). Then, before the products are distributed by an OEM company to each country, an inlet plug or the like is replaced for each country, and a manual in each language is attached. The several physical distribution locations are set by each company in, for example, Singapore (Asia block), Holland (Europe block), Oregon (North America block), and Uruguay (South America Block), depending on convenience for distribution to peripheral countries, customs and other cost, and conditions such as wages of local workers.

The address information includes, for example, address information by region/area or country.

The inventory management terminal 311 writes the same (one type of) shipping table 600 in at least one or more picked image forming apparatuses 400 having the same shipping condition. For example, when a shipping date has been set as the shipping condition, the same (one type of) shipping table 600 is written in each of the image forming apparatuses 400 of the same shipping date. When a shipping destination has been set as the shipping condition, the same (one type of) shipping table 600 is written in each of the image forming apparatuses 400 of the same shipping destination. When a shipping lane has been set as the shipping condition, the same (one type of) shipping table 600 is written in each of the image forming apparatuses 400 of the same shipping lane. When a shipping form has been set as the shipping condition, the same (one type of) shipping table 600 is written in each of the image forming apparatuses 400 of the same shipping form. When a machine type has been set as the shipping condition, the same (one type of) shipping table 600 is written in each of the image forming apparatuses 400 of the same machine type. That is, for example, when the image forming apparatuses 400 are of the same shipping date, the same (one type of) shipping table 600 is written in each of these image forming apparatuses 400 even if the image forming apparatuses 400 are of different shipping destinations (names and addresses), different shipping lanes, different shipping forms, or different machine types.

Alternatively, in a case where the image forming apparatuses 400 are shipped to a large-volume customer, if shipping for a single week is scheduled to be made only to that customer, the shipping table 600 including the information of all products to be shipped to that customer may be written in the image forming apparatuses 400 to be shipped to the large-volume customer in that week, without making any changes in that week.

Still alternatively, for example, when there are a plurality of shipping lanes, the same shipping table 600 may be written in at least one or more image forming apparatuses 400 to be shipped from a same shipping lane A, and a shipping table 600 different from that of the shipping lane A may be written in at least one or more image forming apparatuses 400 to be shipped from a shipping lane B.

As described above, the present embodiment has a feature in that the same (one type of) shipping table 600 is written in image forming apparatuses having the same shipping condition. Since the shipping table 600 with the same contents is written in all image forming apparatuses 400 having the same shipping condition, it is possible to prevent a link between each image forming apparatus 400 and its corresponding information from being erroneously written at the time of shipping. In addition, since the user is not required to take the link association into consideration, the load of the shipping operation can be reduced.

In the above description, a single shipping condition item is used. However, the present embodiment is not limited thereto, and a combination of a plurality of condition items may be used, such as a combination of the same shipping date and the same shipping destination, or a combination of the same shipping destination and the same shipping lane.

When a shipping date has been set as a shipping condition in the example in FIG. 7, in all image forming apparatuses 400 to be shipped on the fifth day of the X-th month, the shipping table 601 is written. That is, the shipping table 601 is written in the image forming apparatuses 400 of serial numbers SN of "7120000281" and "7120000282". In all image forming apparatuses 400 to be shipped on the sixth day of the X-th month, the shipping table 602 is written. That is, the shipping table 602 is written in the image forming apparatuses 400 of serial numbers SN of "7120000283", "7120000284", and "7120000285".

Also, in all image forming apparatuses 400 to be shipped on the seventh day of the X-th month, the shipping table 603 is written. That is, the shipping table 603 is written in the image forming apparatuses 400 of serial numbers SN of "7120000286" and "7120000287". In all image forming apparatuses 400 to be shipped on the eighth day of the X-th month, the shipping table 604 is written. That is, the shipping table 604 is written in the image forming apparatuses 400 of serial numbers SN of "7120000288", "7120000289", and "7120000290".

At Step SA9, along with the writing of the shipping table 600 described above, the inventory management terminal 311 transmits retrieval information to a form issuing terminal 323 (Step SA9). This retrieval information includes the serial number SN, shipping destination information, shipping date, and the like of each image forming apparatus 400 to be retrieved.

By using the retrieval information from the inventory management terminal 311, the form issuing terminal 323 issues forms such as an invoice, a delivery slip, and a tag for the image forming apparatuses 400 to be shipped on that day. Then, the image forming apparatuses 400 are shipped with the forms to the respective delivery destinations of the customer (Step SA10). Also, by using the retrieval information, the inventory management terminal 311 transmits the order table 500 to a local terminal 331 at each service location 330 in charge of maintenance services in each area of each delivery destination of the customer (Step SA11).

<Operation at Service Location>

The local terminal 331 stores the order table 500 transmitted from the inventory management terminal 311 in the USB memory 111 (Step SA12). That is, the order table 500 depicted in FIG. 5 and FIG. 6 is stored in the USB memory 111.

Since the image forming apparatus 400 has been delivered to each delivery destination in each area of the customer based on each installing operation date, a serviceperson visits a relevant place of the customer with the USB memory 111 on hand, and opens the package to perform an installing operation (Step SA13). At this place, after opening the package of the image forming apparatus 400 and installing the image forming apparatus 400, the serviceperson attaches the USB memory 111 to the image forming apparatus 400, and turns on the power. When the power is turned on, the image forming apparatus 400 automatically performs "recognition of the USB memory", "judgment of settings", and "setting-up" based on the information in the order table 500 stored on the attached USB memory 111.

B. Operation of Embodiment

Next, the operation of the above-described embodiment is described.

FIG. 8 is a flowchart for describing operation from shipment to installation of the kitting system according to the present embodiment. First, when the image forming apparatuses 400 having the serial numbers SN stored thereon arrive at the warehouse 310 from the factory 300, the inventory management terminal 311 manages the arrival, inventory, and retrieval of the image forming apparatuses 400 according to the serial numbers SN (Step S10). Then, at predetermined timing, the inventory management terminal 311 receives the order table 500 including the order information CI from the business terminal 321 (Step S12), sets a shipping date for each apparatus, associates (the serial numbers SN of) the image forming apparatuses 400 with delivery destinations in the order in which the shipping date comes earlier (allocation processing), and creates the shipping table 600 (refer to FIG. 7) (Step S14).

Next, by referring to the created shipping table 600, the inventory management terminal 311 judges whether the shipping date has come, that is, any image forming apparatus 400 to be shipped now is present (Step S16). When judged that the shipping date has come (YES at Step S16), one or more image forming apparatuses 400 to be shipped are picked from the warehouse 310 (Step S18). Next, the inventory management terminal 311 writes the same shipping table 600 in the picked image forming apparatuses 400 having the same shipping condition (Step S20). Next, the image forming apparatuses 400 having the shipping table 600 written thereon are shipped to each delivery destination of the customer (Step S22). In addition, the inventory management terminal 311 transmits the order table 500 to the local terminal 331 at each service location 330 in charge of maintenance services in each area of each delivery destination of the customer (Step S24).

For example, when a shipping date has been set as the shipping condition, in the image forming apparatuses 400 (three, in the depicted example) to be shipped on a shipping date of the eighth day of the X-th month, the shipping table 604 depicted in FIG. 7 is written. That is, after the shipping table 604 is written in the image forming apparatuses 400 having serial numbers SN of "7120000288" to "7120000290", the image forming apparatuses 400 are shipped from the warehouse 310 on the eighth day of the X-th month.

Next, at the service location 330, the local terminal 331 stores the order table 500 transmitted from the inventory management terminal 311 in the USB memory 111 (Step S26).

Then, a serviceperson visits a customer's place where the image forming apparatus 400 has already been delivered, with the USB memory 111 on hand, and opens the package and performs an installing operation (Step S28).

Figure 9:
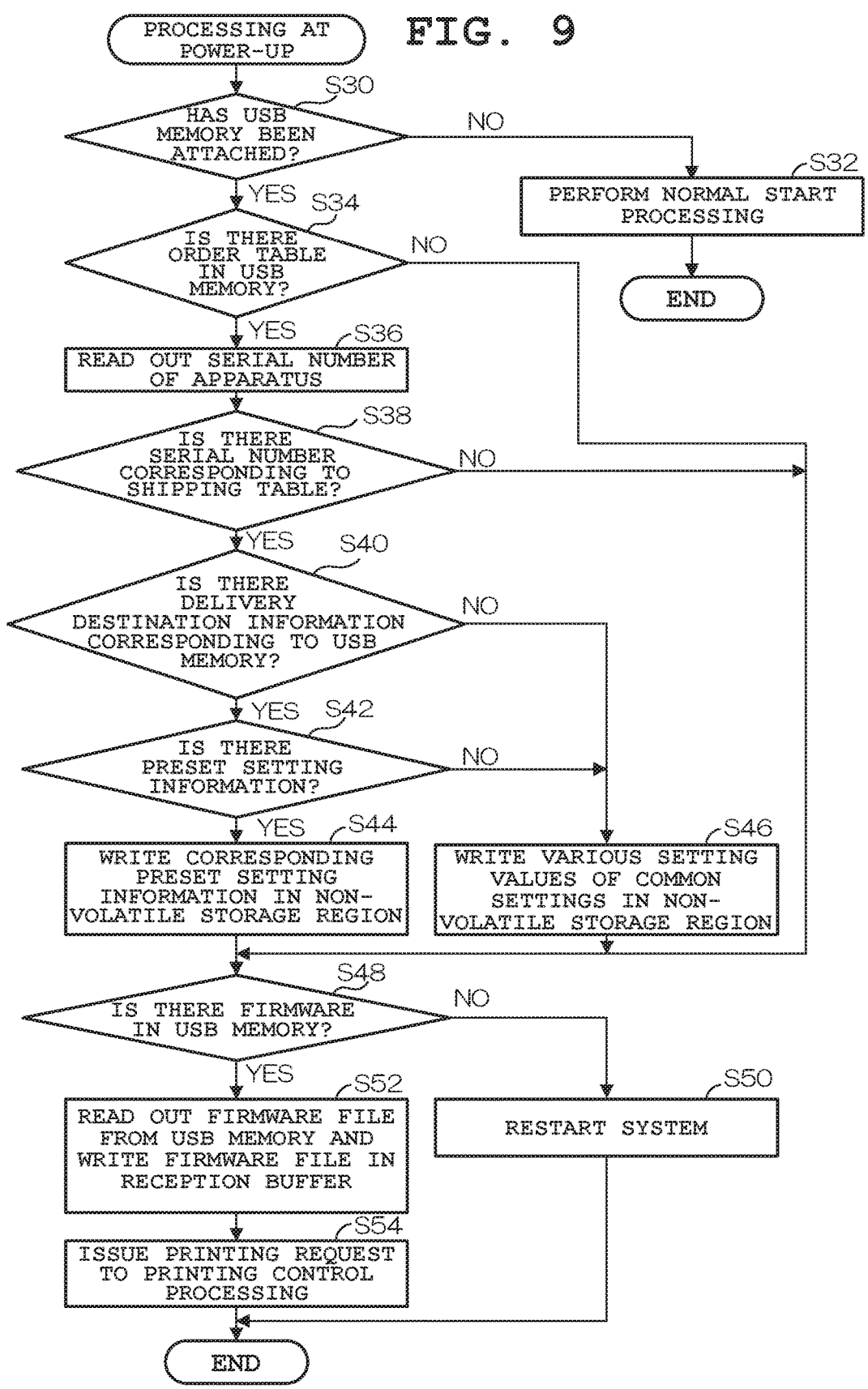
FIG. 9 is a flowchart for describing processing at power-up of an image forming apparatus 400 according to the present embodiment.
Figure 10:
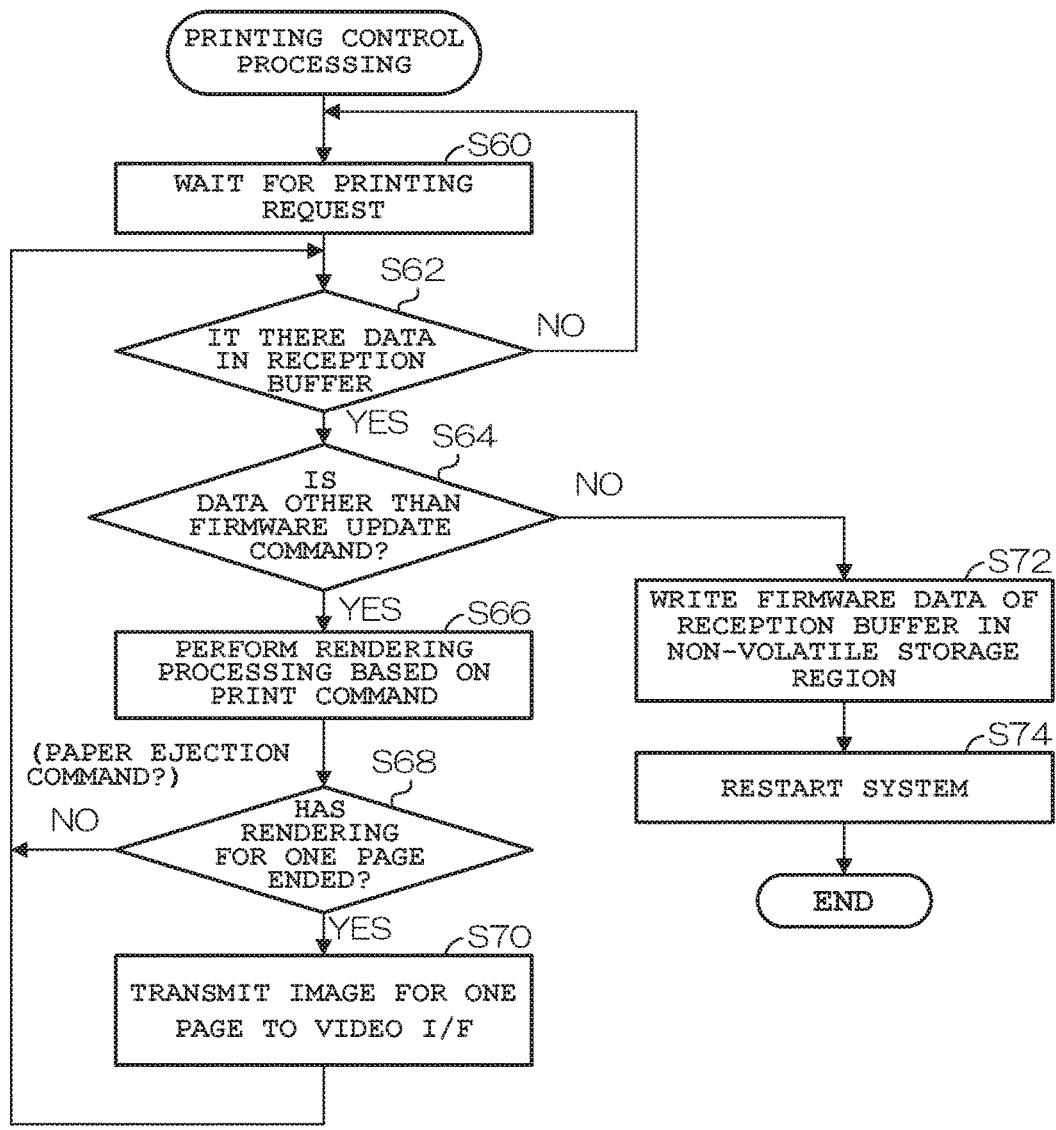
FIG. 10 is also a flowchart for describing processing at power-up of the image forming apparatus 400 according to the present embodiment.

FIG. 9 and FIG. 10 are flowcharts for describing processing at power-up of the image forming apparatus 400 according to the present embodiment. FIG. 11 is a conceptual diagram for describing operation at power-up of the image forming apparatus 400 according to the present embodiment.

At the customer's place, the serviceperson opens the package of the image forming apparatus 400 and installs the image forming apparatus 400. Then, the serviceperson attaches the USB memory 111 to the image forming apparatus 400 and turns on the power. When the power is turned on, the CPU 101 of the image forming apparatus 400 first judges whether the USB memory 111 has been attached (Step S30). When the power has been turned on without the USB memory 111 being attached (NO at Step S30), the CPU 101 performs normal start processing (Step S32), and then ends the processing.

On the other hand, when the power has been turned on with the USB memory 111 being attached (YES at Step S30), the CPU 101 judges whether the order table 500 is present in the USB memory 111 (Step S34). When the order table 500 is present in the USB memory 111 (YES at Step S34), the CPU 101 reads out the serial number SN of the apparatus from the serial number storage area 207 (Step S36). Next, as depicted in an upper portion of FIG. 11, the CPU 101 checks the serial number SN of the apparatus against the serial number of the image forming apparatus 400 on the shipping table 603 to judge whether the serial number SN matching the serial number SN of the apparatus is present (Step S38). When the same serial number SN is present on the shipping table 600 of the image forming apparatus 400 (YES at Step S38), the CPU 101 refers to the order table 500 in the USB memory 111 to judge whether the same order information CI as the order information CI corresponding to the matched serial number SN is present (Step S40).

When the same order information CI as the order information CI corresponding to the matched serial number SN is present on the order table 500 in the USB memory 111 (YES at Step S40), the CPU 101 judges whether the preset setting information PS corresponding to the matched order information CI is present (Step S42). When the preset setting information PS corresponding to the matched order information CI is present (YES at Step S42), the CPU 101 reads out the preset setting information PS corresponding to the order information CI from the order table 500 in the USB memory 111, and writes the read information in the non-volatile storage area 204, as depicted in a lower portion of FIG. 11 (Step S44).

On the other hand, when the order information CI that is the same as the order information CI corresponding to the matched serial number SN is not present on the order table 500 in the USB memory 111 (NO at Step S40) or when the same order information CI is present but the preset setting information PS is not present on the order table 500 in the USB memory 111 (NO at Step S42), the CPU 101 reads out the preset setting information PS written in common settings (refer to FIG. 5 and FIG. 6) from the USB memory 111, and writes the read information in the non-volatile storage area 204 (Step S46).

When Steps S44 and S46 end, when the order table 500 is not present in the USB memory 111 (NO at Step S34), or when the serial number corresponding to the shipping table 600 is not present in the shipping table storage area 208 (NO at Step S38), the CPU 101 judges whether firmware (file) is present in the USB memory 111 (Step S48). When firmware (file) is not present in the USB memory 111 (NO at Step S48), the CPU 101 restarts the system (Step S50). As a result, when the preset setting information PS is written in the non-volatile storage area 204, the restarted system sets a network, printing conditions, and the like according to this preset setting information PS and enters a standby mode.

On the other hand, when firmware (file) is present in the USB memory 111 (YES at Step S48), the CPU 101 reads out the firmware file FW from the USB memory 111, and writes the read firmware file FW together with a "firmware update command" in the reception buffer 202 (Step S52). Next, the CPU 101 issues a printing request to the printing control processing 203 (Step S54). When the printing request is received and the command in the print data read out from the reception buffer 202 is a "firmware update command", the CPU 101 in the printing control processing 203 writes the firmware file FW in the non-volatile storage area 204. Then, by the system being restarted, the new firmware file FW written in the non-volatile storage area 204 causes the program (firmware) for controlling the image forming apparatus 400 to be rewritten (updated). Then, the CPU 101 ends the processing.

Next, the operation of the printing control processing 203 is described with reference to FIG. 10. Note that this printing control processing 203 is also performed in the normal printing operation. In the printing control processing 203, the CPU 101 waits for a printing request (Step S60). Then, when a printing request is received, the CPU 101 refers to the reception buffer 202 to judge whether print data is present (Step S62). When print data is not present in the reception buffer 202 (NO at Step S62), the CPU 101 returns to Step S60 to continue a print request standby state.

On the other hand, when print data is present in the reception buffer 202 (YES at Step S62), the CPU 101 judges whether the data is other than a firmware update command (Step S64). When the data is other than a firmware update command (YES at Step S64), the CPU 101 analyzes the print data in the reception buffer 202, and causes rendering processing to be performed according to that command (Step S66). Next, the CPU 101 judges whether rendering processing for one page has ended (NO at Step S68). When judged that rendering processing for one page has not ended (NO at Step S68), the CPU 101 returns to Step S62 to repeat the above-described processing to perform rending processing for one page.

On the other hand, when judged that rendering processing for one page has ended (YES at Step S68), the CPU 101 transmits an image for this one page to the Video I/F circuit 103 (Step S70). Accordingly, the printing mechanism (such as a toner transfer device and a developing device) 110 performs processing for printing the image for one page on a paper sheet.

On the other hand, when judged by referring to the reception buffer 202 that a firmware update command is present (NO at Step S64), the CPU 101 writes the firmware data in the reception buffer 202 in the non-volatile storage area 204 (Step S72). Subsequently, the CPU 101 restarts the system (Step S74). Then, the restarted system executes new firmware written in the non-volatile storage area 204 and, when the preset setting information PS is written in the non-volatile storage area 204, the CPU 101 sets a network, printing conditions, and the like according to the preset setting information PS written in the non-volatile storage area 204, and enters a standby mode. Then, the CPU 101 ends the processing.

The serviceperson similarly opens the packages of the second and third image forming apparatuses 400, installs the apparatuses, attaches the USB memory 111 to each apparatus, and turns on the power. As in the case of the first apparatus, the CPU 101 of each of the second and third image forming apparatuses 400 reads out the preset setting information PS with regard to the order information CI corresponding to the serial number SN of the apparatus from the order table 500 written in the USB memory 111 depicted in FIG. 11, and automatically executes preset settings.

In the above-described embodiment, at the time of shipping, the shipping table 600 in which the order information CI and the serial number SN have been linked with each other is written in the image forming apparatuses 400 having the same shipping condition and, at the time of installation, the delivery destination of the apparatus is specified from the shipping table 600 and the preset setting information PS linked with the order information CI matching the delivery destination of the apparatus is acquired to set a network, printing conditions, and the like. Therefore, the load of operation can be reduced, and erroneous setting can be prevented. Also, since the same shipping table 600 is written in all image forming apparatuses 400 having the same shipping condition, link association can be prevented from being erroneously written at the time of shipping. Also, since the user is not required to take the link association into consideration, the load of the shipping operation can be reduced.

Also, in the above-described embodiment, the image forming apparatuses 400 of the same shipping date are sorted by shipping destination, and the same shipping table 600 is written in all of the image forming apparatuses 400 sorted by shipping destination. Therefore, the amount of data to be written in the image forming apparatus 400 can be reduced when, for example, the number of image forming apparatuses 400 having the same shipping date is enormous.

Moreover, in the above-described embodiment, based on the serial number SN of the apparatus and the serial number SN on the shipping table 600, the order information CI directed to the apparatus is specified from among the order information CI included in the shipping table 600. Then, based on the specified order information CI directed to the apparatus, an operation condition is set based on the preset setting information PS for the image forming apparatus 400 in the order table 500 in the USB memory 111. As a result of this configuration, for example, a link between the serial number SN and the preset setting information PS by a serviceperson is not required and erroneous selection of the preset setting information PS does not occur, whereby the load of operation can be reduced and erroneous setting can be prevented. In addition, since link association is performed by using the serial number SN, the shipping table 600, and the order table 500, the order table 500 to be written in the USB memory 111 may have all pieces of order information for all location areas of the customer. Therefore, the order table 500 is not required to be recreated with awareness of each area, whereby the work load can be reduced, and erroneous setting can be prevented. In addition, the order information may be that including only the information of the location of a customer in an area where a serviceperson is in charge. Therefore, the amount of data to be written in the USB memory 111 can be decreased.

Furthermore, in the case as well where the preset setting information PS is to be created, the user is only required to be aware of a delivery destination and the setting condition of the image forming apparatus 400 to be installed at that destination, and is not required to be particularly aware of the serial number SN of the image forming apparatus 400. Therefore, an erroneous link between the serial number SN and the preset setting information PS can be prevented.

Still further, in the above-described embodiment, when the preset setting information PS with regard to the image forming apparatus 400 is not in the order table 500, the operation conditions of the image forming apparatus 400 are set based on common setting information included in the order table 500. Therefore, the load of operation can be reduced, and erroneous setting can be prevented.

Yet still further, in the above-described embodiment, a salesperson is only required to have a meeting with a buyer of a dealer so as to create the order table 500 and to upload the order table 500 online from the business terminal 321 of a sales office 320 to the inventory management terminal 311 at the warehouse 310 (Step SA5). As a result of this configuration, a salesperson is not required to visit a warehouse and link each image forming apparatus 400 in stock with a customer's installation destination. In addition, a salesperson is not required to go to a service location in each area to hand out the order table 500 or have a meeting with a serviceperson. That is, a serviceperson is only required to perform normal business, and is not required to perform special irregular processing, so that no element of increasing the occurrence of error is present.

Yet still further, in the above-described embodiment, a buyer of a customer is only required to have a meeting with a person at the installation site of the image forming apparatus 400 at least by phone or via mail and to inform the salesperson of company-wide rules, a total management plan of the customer company, a request regarding each installation destination in each area, and the like.

Yet still further, in the above-described embodiment, at the warehouse 310, the image forming apparatuses 400 arrived from the factory 300 are subjected to inventory management together with information regarding the serial numbers SN by use of the inventory management terminal 311. When the order table 500 is accepted from the business terminal 321 at the sales office 320, allocation processing is performed by associating the image forming apparatuses 400 in stock one by one, the shipping table 600 is created, and an invoice for delivery and the like are issued from the form issuing terminal 323, by the shipping date. Then, the image forming apparatuses 400 are shipped according to a shipping plan, and the order table 500 is sent online to the service location 330 in charge of each distribution destination in each area, whereby an instruction for an installation operation at the customer's place is given. These operations are normal business operations that are regularly performed, in which human operation is performed only as a part of an operation of physically moving an object. Therefore, no special irregular operation is required to be performed, so that no element of increasing the occurrence of error is present. The only thing different from the conventional business operation is an operation of writing the shipping table 600 in the image forming apparatus 400, which is a feature of the present invention. However, this shipping table 600 is a table already created in normal business operation, and therefore it is only required that an operation of writing the shipping table 600 is added to automated operations on a shipping lane.

Conventionally, a serviceperson, who visits a customer in each area for installation, first receives the order table 500 from the inventory management terminal 311, at the local terminal 331 at the service location 330, and after checking information regarding the customer for visit and installation by using paper or a mobile terminal, visits the customer at an installation date. Here, conventionally, the serviceperson refers to the preset setting information PS for each image forming apparatus 400 at the installation location by using paper or a mobile terminal, sets and updates each setting item through an operation panel of the image forming apparatus 400, and checks to see if settings are made correctly one by one. However, in the above-described embodiment, a serviceperson is only required to copy the order table 500 from the local terminal 331 to the USB memory 111, visit an installation site of a customer, attach the USB memory 111 to the image forming apparatus 400, and turn on the image forming apparatus 400, after which the image forming apparatus 400 automatically makes judgments, sets all pieces of preset setting information PS, and complete the processing. Accordingly, the operation time is significantly shortened and, since there is no need to operate the operation panel, an input error on the operation panel or failing to make settings can be prevented. That is, elements causing errors do not exist.

As a potential error that may occur in the above-described embodiment is an error when information (order information CI) regarding an installation destination included in the order table 500 does not correspond to that included in the shipping table 600. However, even in this case, in the above-described embodiment, settings are made based on common setting information included in the order table 500, and therefore it is possible to seta customer's standard setting state, minimum settings, and the like. Therefore, the load of follow-up processing can be made significantly light.

In general, in order to perform kitting service, various irregular processing has to be further performed, such as processing different from normal processing and consensus-building processing. With an increase of operations different from normal business, check operation has to be performed with keen attention more than normal. Therefore, the whole operation time is enormously increased, and the possibility of occurring error is increased. Once an error occurs, time and human power taken for recovery from the error are further significantly increased. However, in the above-described embodiment, no element that increases time or human power exists, so that time can be saved and elements causing errors can be eliminated. Therefore, even if the processing in the above-described embodiment is performed as normal processing as it is, no burden is imposed. As a matter of course, even in a case where kitting service is performed by a specialist by profession, the processing in the above-described embodiment may be adopted as normal processing.

In the above-described embodiment, the USB memory 111 is used. However, the present invention is not limited thereto and it may be any external storage medium as long as it is removable and data-rewritable.

Also, in the above-described embodiment, the configuration using the USB memory 111 has been adopted. However, the present invention is not limited thereto and a configuration may be adopted in which, after the installation of the image forming apparatus 400, the service location, a portable terminal of the serviceman, and the like are accessed by using communication means to acquire the order sheet 500 and preset setting processing is performed in a similar manner.

Moreover, in the above-described embodiment, as the image forming apparatuses 400 are shipped, the order table 500 is transmitted from the inventory management terminal 311 to the local terminal 331 at each service location 330 in charge of maintenance service in each area of each delivery destination. However, a configuration may be adopted in which only the shipping information of the image forming apparatuses 400 is transmitted (reported) from the inventory management terminal 311 to the business terminal 321 and, when this information is received, the business terminal 321 transmits the order table 500 to the local terminal 331 at each service location 330 in charge of maintenance service in each area of each delivery destination.

While the present invention has been described with reference to the preferred embodiments, it is intended that the invention be not limited by any of the details of the description therein but includes all the embodiments which fall within the scope of the appended claims.

What is claimed is:
1. A method comprising:
writing identification information for identifying an image forming apparatus in each image forming apparatus;
selecting image forming apparatuses having a predetermined shipping condition from image forming apparatuses in stock, based on an order table where at least order information for each image forming apparatus and preset setting information for setting for each image forming apparatus when each image forming apparatus is installed have been associated with each other; and
writing, in each of the selected image forming apparatuses before shipping, a shipping table where at least the order information for each image forming apparatus and the identification information for each image forming apparatus have been associated with each other,
wherein shipping tables having same contents are written in the selected image forming apparatuses.
2. The method according to claim 1, further comprising:
sorting the image forming apparatuses by shipping destination,
wherein the shipping table is written in each of the image forming apparatuses sorted by shipping destination.

3. The method according to claim 1, wherein the shipping condition is one or a combination of a shipping date, a shipping destination, a shipping lane, a shipping form, and a machine type.

4. An image forming apparatus comprising:
an identification information storage section which stores identification information for identifying the image forming apparatus; and
a shipping table storage section which stores, before shipping, a shipping table where at least order information for each image forming apparatus and identification information for each image forming apparatus have been associated with each other,
wherein shipping tables having same contents are written in image forming apparatuses having a predetermined shipping condition.

5. The image forming apparatus according to claim 4, further comprising:
a specifying section which specifies order information directed to the image forming apparatus from among order information for each image forming apparatus included in the shipping table, based on the identification information of the image forming apparatus stored in the identification information storage section and the identification information for each image forming apparatus included in the shipping table stored in the shipping table storage section; and
a setting section which (i) reads out, from an order table where at least the order information for each image forming apparatus and preset setting information for setting in each image forming apparatus when each image forming apparatus is installed have been associated with each other, preset setting information for the image forming apparatus, based on the order information directed to the image forming apparatus specified by the specifying section, and (ii) sets an operation condition of the image forming apparatus based on the preset setting information.

6. The image forming apparatus according to claim 5, further comprising:
a judging section which judges, upon power-up, whether an external storage medium having the order table stored thereon has been attached,
wherein the specifying section specifies the order information directed to the image forming apparatus when the judging section judges that the external storage medium has been attached, and
wherein the setting section reads out the preset setting information for the image forming apparatus from the order table stored in the external storage medium, and sets the operation condition of the image forming apparatus based on the preset setting information.

7. The image forming apparatus according to claim 5, wherein the order table includes common setting information which is usable in common irrespective of the identification information of the image forming apparatus, and
wherein the setting section sets the operation condition of the image forming apparatus based on the common setting information included in the order table when the preset setting information for the image forming apparatus has not been stored on the order table.

8. The image forming apparatus according to claim 4, wherein the shipping condition is at least one or a combination of a shipping date, a shipping destination, a shipping lane, a shipping form, and a machine type.

9. A method comprising:
specifying, when an image forming apparatus is turned on, order information directed to the image forming apparatus based on identification information for identifying the image forming apparatus and a shipping table written before shipping in which at least order information for each image forming apparatus and identification information for each image forming apparatus have been associated with each other, from among the order information for each image forming apparatus included in the shipping table;
reading out preset setting information for the image forming apparatus from an order table where at least the order information for each image forming apparatus and preset setting information for setting in each image forming apparatus when each image forming apparatus is installed have been associated with each other, based on the specified order information directed to the image forming apparatus; and
setting an operation condition of the image forming apparatus based on the preset setting information,
wherein contents of the shipping table written in the image forming apparatus and contents of a shipping table of another image forming apparatus having a same predetermined shipping condition are identical.

10. The method according to claim 9, further comprising:
judging whether an external storage medium having the order table stored thereon has been attached, when the image forming apparatus is turned on,
wherein the specifying specifies the order information directed to the image forming apparatus when the external storage medium is judged to have been attached,
wherein the reading reads out the preset setting information for the image forming apparatus from the order table stored in the external storage medium, and
wherein the setting sets the operation condition of the image forming apparatus based on the preset setting information.

11. The method according to claim 9, wherein the order table includes common setting information which is usable in common irrespective of the identification information of the image forming apparatus, and
wherein the setting sets the operation condition of the image forming apparatus based on the common setting information included in the order table, when the preset setting information for the image forming apparatus has not been stored on the order table.

12. The method according to claim 9, wherein the shipping condition is at least one or a combination of a shipping date, a shipping destination, a shipping lane, a shipping form, and a machine type.

13. A kitting system constituted by an image forming apparatus and an external storage medium,
wherein the external storage medium stores an order table where at least order information for each image forming apparatus and preset setting information for setting each image forming apparatus when each image forming apparatus is installed have been associated with each other, and
wherein the image forming apparatus comprises:
an identification information storage section which stores identification information for identifying the image forming apparatus,
a shipping table storage section which stores, before shipping, a shipping table where at least the order information for each image forming apparatus and identification information for each image forming apparatus have been associated with each other, a specifying section which specifies order information directed to the image forming apparatus based on the identification information of the image forming apparatus stored in the identification information storage section and the shipping table stored in the shipping table storage section, and a setting section which (i) reads out preset setting information for the image forming apparatus from the order table stored in the external storage medium based on the order information directed to the image forming apparatus specified by the specifying section, and (ii) sets an operation condition of the image forming apparatus based on the preset setting information, wherein shipping tables having same contents are written in image forming apparatuses having a predetermined shipping condition.

14. The kitting system according to claim 13, wherein the image forming apparatus further comprises a judging section which judges whether the external storage medium has been attached, and wherein the setting section sets the operation condition of the image forming apparatus when the image forming apparatus is turned on and the judging section judges that the external storage medium has been attached.

15. The kitting system according to claim 14, wherein the order table includes common setting information which is usable in common irrespective of the identification information of the image forming apparatus, and wherein the setting section sets the operation condition of the image forming apparatus based on the common setting information included in the order table when the preset setting information for the image forming apparatus has not been stored on the order table stored in the external storage medium.

* * * * *